United States Patent [19]
LaMonica

[11] Patent Number: 5,310,487
[45] Date of Patent: May 10, 1994

[54] MEMBRANE TECHNOLOGY FOR EDIBLE OIL REFINING

[75] Inventor: David A. LaMonica, Hermosa Beach, Fla.

[73] Assignee: Rochem Separation Systems, Inc., Torrance, Calif.

[21] Appl. No.: 53,599

[22] Filed: Apr. 27, 1993

[51] Int. Cl.⁵ .............................................. B01D 61/14
[52] U.S. Cl. ................................. 210/651; 210/321.84
[58] Field of Search .................. 210/643, 651, 321.84, 210/639

[56] References Cited

U.S. PATENT DOCUMENTS 3,847,818 11/1974 Madsen et al. ............... 210/321.84
4,787,981 11/1988 Tanahashi et al. ............. 210/651 X Primary Examiner—Frank Spear
Attorney, Agent, or Firm—Weingram & Zall

[57] ABSTRACT

A method for refining domestic edible oils by membrane separation technology involves treating such oils in a membrane module system which provides optimal separation performance and service life. The described process simplifies edible oil processing and permits the attainment of the desired product in an essentially single step operation.

5 Claims, 3 Drawing Sheets

MEMBRANE TECHNOLOGY FOR EDIBLE OIL REFINING

BACKGROUND OF THE INVENTION

1. Field of the Invention

The present invention relates to a method for refining domestic edible oils using non-aqueous membranes. More particularly, the present invention relates to a method for refining edible oils by membrane separation technology using a polyetherimide membrane.

During the past decade, considerable interest has been focused upon the processing of edible oils such as soybean oil, cotton seed oil, corn oil and the like. In the processing of such oils, it has been common to treat the oil with an organic solvent such as hexane to obtain miscella. Following, the organic solvent is removed, so yielding a crude glyceride oil composition. Unfortunately, the crude oils so obtained typically comprise up to 10%, by weight, of impurities including phospholipids, organic sulfur compounds, waxes, dye compounds and the like. These impurities typically have adverse affects and it is necessary to remove them from the crude oil to enhance the usefulness and marketability of the product.

Workers in the art discovered that these impurities could be effectively removed from the crude oil by means of different types of industrial membranes, selection of a particular membrane being dependent upon the materials to be separated. Thus, for example, microfiltration involves the membrane separation of macro molecules ranging from 500 to 2 million Angstrom units, ultra filtration with molecules ranging is size from 40–2,000 Angstroms and reverse osmosis with ions and molecules ranging in size up to 20 Angstroms.

In accordance with the ultrafiltration/reverse osmosis process, a crude glyceride oil composition is diluted with an organic solvent such as hexane and contacted with an ultrafiltration reverse osmosis membrane, typically selected from among polysulfones, polyacrylonitriles, and various polyamides which remove the solvent and yields a membrane permeable solution containing a degummed oil. Although, such techniques have met with a certain degree of success, inherent limitations have precluded the total exploitation thereof. More specifically, the complete removal of phospholipids from the crude oil is impeded by the characteristics of the membrane employed, so necessitating the use of a plurality of processing steps including, degumming, refining, bleaching and deodorizing to remove free fatty acids, phosphatides, particulates, chlorine materials and the like. Considerable amounts of energy in the form of steam or electricity are required in effecting these processes, each of which is required to obtain properly processed crude oil. Accordingly, workers in the art have focused their interest upon the development of alternate methods for refining the edible oils.

2. Description of the Prior Art

Typical prior art references describing methods for effecting this end are as follows:

U.S. Pat. No. 3,370,102 describes a process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils and hydrocarbon mixtures. Expressly recited is the separation of aromatics from kerosene.

U.S. Pat. No. 2,958,656 teaches the separation of hydrocarbons by type, i.e., aromatic, unsaturated, saturated, by passing a portion of a mixture thereof through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

U.S. Pat. No. 4,366,062 teaches reverse osmosis using a composite isocyanurate membrane. The method selectively separates at least one water soluble material from an aqueous solution. The membrane comprises a microporous substrate and a barrier layer about 0.01 to 0.1 micron thick. It is composed of a cross-linked polymeric material having an isocyanurate structure and substituents appended thereto selected from among hydrogen, glycidyl groups and alkyl radical groups having from 2 to 5 carbon atoms which may also contain functional hydroxyl groups or glycidyl groups. The crosslinked polymeric material has ester or ether linkages or combinations thereof connecting the isocyanurate structures to each other. There are no urethane groups present.

U.S. Pat. No. 4,557,949 teaches a method for making the reverse osmosis semipermeable membrane disclosed in U.S. Pat. No. 4,366,062.

European Application 0044872 teaches selectively separating water soluble materials from a solution under reverse osmosis conditions using a membrane having a porous support layer carrying a barrier layer of cross-linked isocyanurate polymer.

Japanese Application 81/160960 teaches an isocyanurate network terpolymer useful for the production of a selective permeation membrane. A polymer having hydroxyl groups and tertiary amine groups in the side chain is reacted with cyanuric chloride and subjected to terpolymerization by reacting the tertiary amine groups with the resultant hydrochloride to give a polymerized polyisocyanurate. A polymer made using glycidyl methacrylatestyrene copolymer, diethyl amine in benzene and methanol was produced having a 2-hydroxy-3-diethylaminopropyl group. This (polytetra fluorethylene) polymer was crosslinked with cyanuric chloride and cast on a PTFE plate and kept for 24 hours at 40° to give a 44 $\mu$ membrane. This membrane was used to separate a mixture of cyclohexane and benzene under pervaporation conditions. A permeate gas which was 100% benzene was recovered at a rate 0.0025 g/m$^2$-hr.

U.S. Pat. 4,787,981 (Tanashi, et al.) which issued on Nov. 29, 1988, discloses a process for the purification of crude glyceride oil compositions which comprises diluting a crude glyceride oil containing gums and waxes with an organic solvent and contacting the diluted crude oil composition with a semipermeable membrane comprising a polyimide. The resultant semipermeable membrane permeable liquid is then bleached with a clay and deodorized to obtain a purified glyceride oil.

U.S. Pat. No. 4,929,357 (R.C. Schucker) discloses the use of a non-porous isocyanurate-crosslinked polyurethane membrane for separating aromatic from non-aromatic hydrocarbons.

U.S. Pat. No. 4,929,358 (B.A. Koenitzer) discloses the separation of aromatic hydrocarbons from non-aromatics by permeation of the aromatic compound through a polyurethane-imide membrane under pervaporation or reverse osmosis conditions.

Although each of the foregoing processes has advanced the art, the search has continued for the development of membrane separation technology of enhanced energy efficiency which enables workers in the art to economically isolate edible oils.

OBJECTS AND SUMMARY OF THE INVENTION

An object of the present invention is to refine domestic edible oils to remove undesirable compounds therefrom including free fatty acids, phosphatides, particulate and the like.

Another object of the present invention is to degum, refine, bleach and deodorize edible crude oils in a single step operation.

Still another object of this invention is to provide a process for enhancing energy savings in conventional degumming, refining and bleaching of edible oils.

Another object of the invention is to provide a membrane process for refining edible oils using a semipermeable membrane comprising a polyimide which is disposed in an apparatus including spacer elements for guiding flowing media through the membrane which is accommodated between each spacer element.

Still another object of the present invention is to provide a process for refining edible oils in which waste waters and bleaching clays are eliminated.

Another object of the invention is to provide a process for the refining of edible oils in which essentially all of the hydrated and non-hydrated phospholipids, most of the color compounds and some of the free fatty acids are held in the retentate while neutral oils and hexane permeate the membrane employed.

Yet another object of the invention is to provide a process for preparing soybean oil for direct physical refining.

Another object of the invention is to provide a process for refining edible oils in which the losses of neutral oil by entrapment with degumming residues and soaps found during alkali refining is substantially reduced.

A further object of the invention is to provide a process for the reduction of energy requirements for desolventizing soybean oil hexane miscella.

Yet another object of the present invention is to provide a process for refining edible oils in which the capital investment in the refining operation is reduced by combining purification steps into one process and the elimination of waste streams such as acidic waste water and used bleaching clay from the edible oil refining process.

In accordance with the present invention, these objectives are attained in a novel processing sequence using an apparatus for filtering and separation with a microfiltration, ultrafiltration, reverse osmosis membrane disposed between two essentially plate-like spacer elements.

More specifically, the present invention comprises purifying a crude edible oil composition containing gum material and wax impurities with an organic solvent using a semipermeable membrane comprising a polyimide consisting essentially of a repeating unit having the general formula

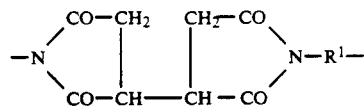

wherein $R^1$ represents a divalent organic group with an apparatus for filtering and separating a flowing medium by microfiltration, ultrafiltration and reverse osmosis In this apparatus, the membrane spacer filter element is accommodated between two essentially plate-like spacer elements about which the medium flows.

BRIEF DESCRIPTION OF THE DRAWINGS

The foregoing objects and other objects and advantages of the present invention will be more readily understood by reference to the following detailed description taken in conjunction with the accompanying drawings wherein.

DETAILED DESCRIPTION OF THE INVENTION

Before discussing the merits of the present invention, it is advantageous to examine the conventional technique employed by workers in the art for refining edible crude oils. For this purpose, reference is made to FIG. 1 which depicts a flow diagram of a typical prior art process for effecting this end.

Figure 1:
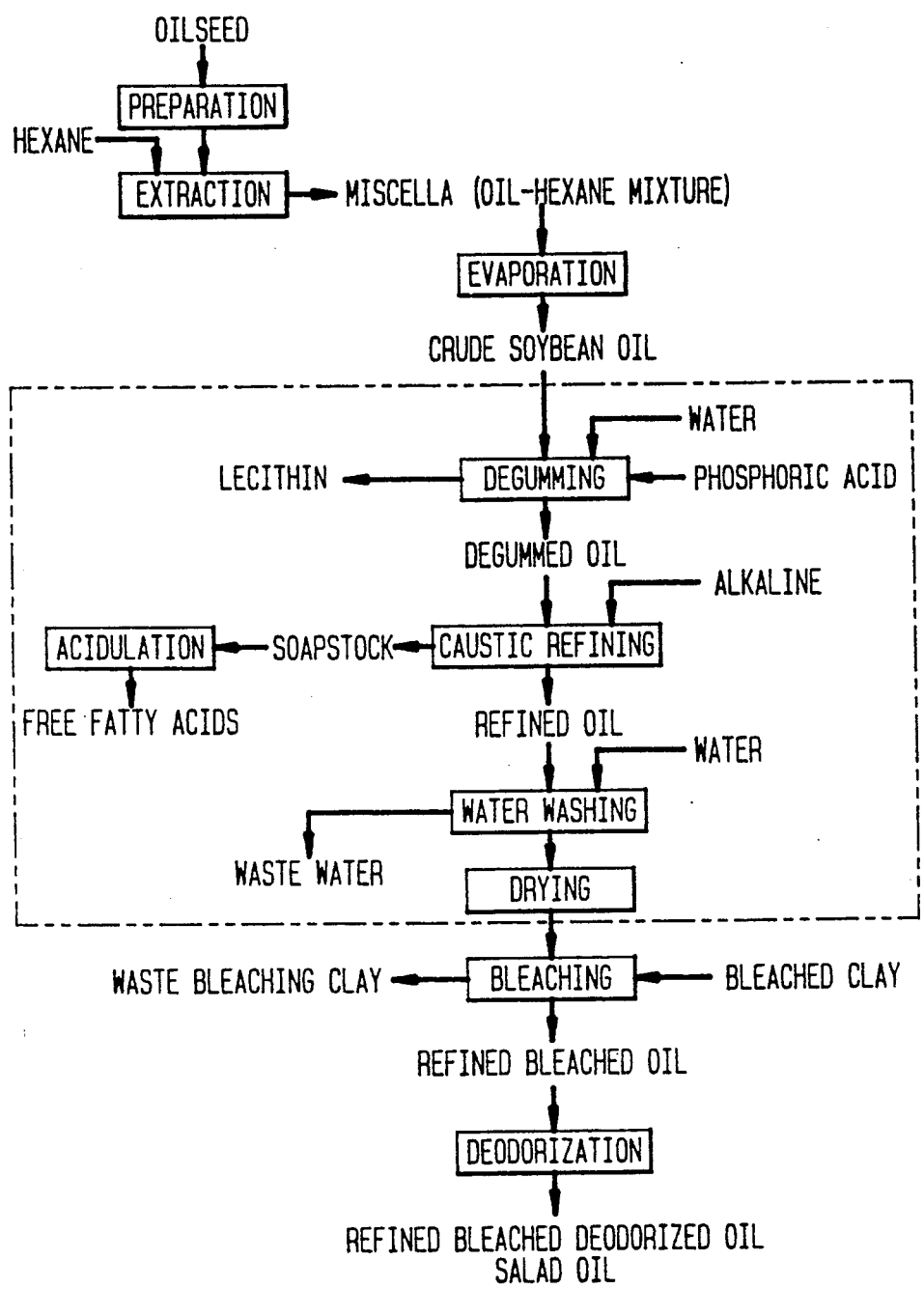
FIG. 1 is a flow diagram of a typical prior art process for refining edible oils.

In FIG. 1, a typical vegetable oil such as soybean oil, rapeseed oil, cottonseed oil, safflower oil, corn oil, sunflower oil and the like is extracted with an organic solvent such as hexane to obtain miscella comprising the solvent and dissolved impurities. Following, the solvent is evaporated to obtain a crude glyceride oil composition, as for example, soybean oil. This crude glyceride oil usually comprises from 0.5-10% by weight of impurities including phospholipids such as lecithin as its primary ingredient, waxes such as higher alcohols, organic sulfur compounds, peptides, free fatty acids, hydrocarbons, carbohydrates, dye compounds, metals and the like. These impurities cause polymerization or decomposition during the processing sequence or in use or upon heating and tend to result in oil coloration or unpleasant odors with the concomitant acceleration of oxidation or deterioration. Accordingly, the next step in the prior art process involves degumming to remove these impurities.

With reference again to FIG. 1, the first step in the process for heating the crude oil following extraction involves degumming which is effected by adding water to the oil to hydrate the gum material which is primarily composed of phospholipids which may be further purified to yield lecithin. Phosphoric acid may also be used to enhance the degumming operation. The degummed oil is then subjected to chemical (caustic) refining, typically with sodium hydroxide, which reacts with free fatty acids to produce soaps which are acidified to remove residual phospholipids.

Following, pigments and destabilizing peroxide-like compounds are absorbed by acid activated bleaching clays and, finally, the oil is heated under vacuum with steam sparging to strip trace amounts of free fatty acids, aldehydes and ketones and other volatile compounds.

In this processing sequence, large amounts of energy in the form of steam or electricity are required. Further, each step in this edible oil processing removes only one or two of the undesirable components. In addition to the energy costs, caustic refining, water washing and bleaching produce waste streams such as high BOD acidic waste water and used bleaching clay that either requires treating or recovery due to economic or environmental concerns.

Figure 2:
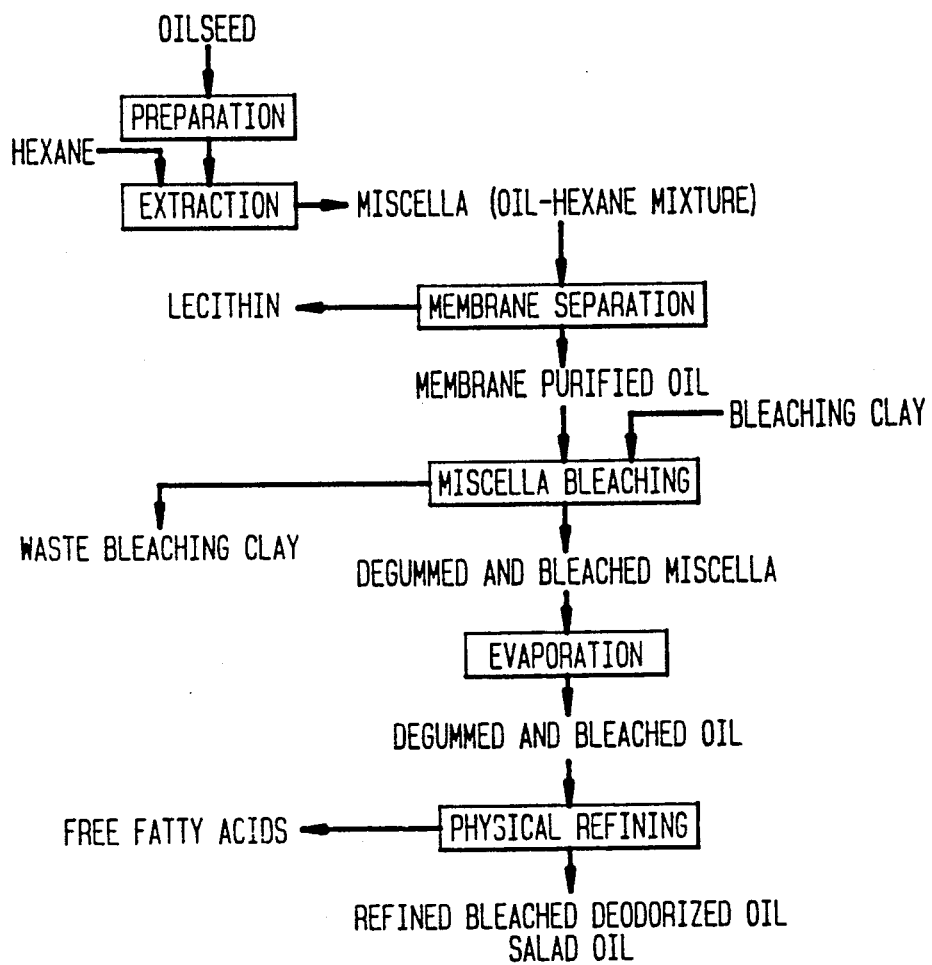
FIG. 2 is a flow diagram of the refining process of the invention.

The process which is the subject of the invention is shown in the flow diagram of FIG. 2. As noted, following the conventional preparation and extraction steps, the miscella comprising a mixture of organic solvent and crude oil, is subjected to membrane separation to yield a purified oil in a single stage operation. In the membrane separation process, phospholipids are removed in addition to most colored pigments and some of the free fatty acids. Accordingly, all steps in FIG. 1 shown in the dotted area are eliminated, that is, no necessity exists for degumming, refining, water washing and drying. The only steps remaining in the processing are physical refining steps. An added benefit arises from the fact that the bleaching requirements are reduced to entrapment of some of the coloring pigments during the membrane separation process.

The significance of the invention is more fully understood when it is recognized that elimination of the degumming process results in a reduction of neutral oil loss of the order of 80% and eliminates the necessity of refining phosporic acid for non-hydratable phosphatide while producing lecithin, a value added product.

Still further, the elimination of caustic refining avoids the necessity for acidulation as well as completely eliminating waste waters from the degumming, acidulation and water washing steps. It also avoids the need for an oil drying process.

An added benefit to the novel processing sequence arises from the fact that there is at least a 50% reduction in the bleaching requirements during the bleaching process.

The resultant oils obtained from the described process, typically soybean, cottonseed, peanut, canola oils and the like can be readily physically refined. This provides a significant advantage which is indigenous to imported palm oil. Palm oil, of course, is a major price competitor of domestic oils such as soybean, peanut and cottonseed oil in world markets and is prepared by physical refining. In this process, the oil is heated at high temperatures under vacuum during which free fatty acids and undesirable odor and flavor compounds are removed. Heretofore, physical refining has not been applicable to domestic oils because of their high phospholipid content, namely, gums and lecithins. These compounds tend to hydrate and become mucilaginous during degumming and/or caustic refining and carry off occluded neutral oil during their removal by centrifugation.

Figure 3:
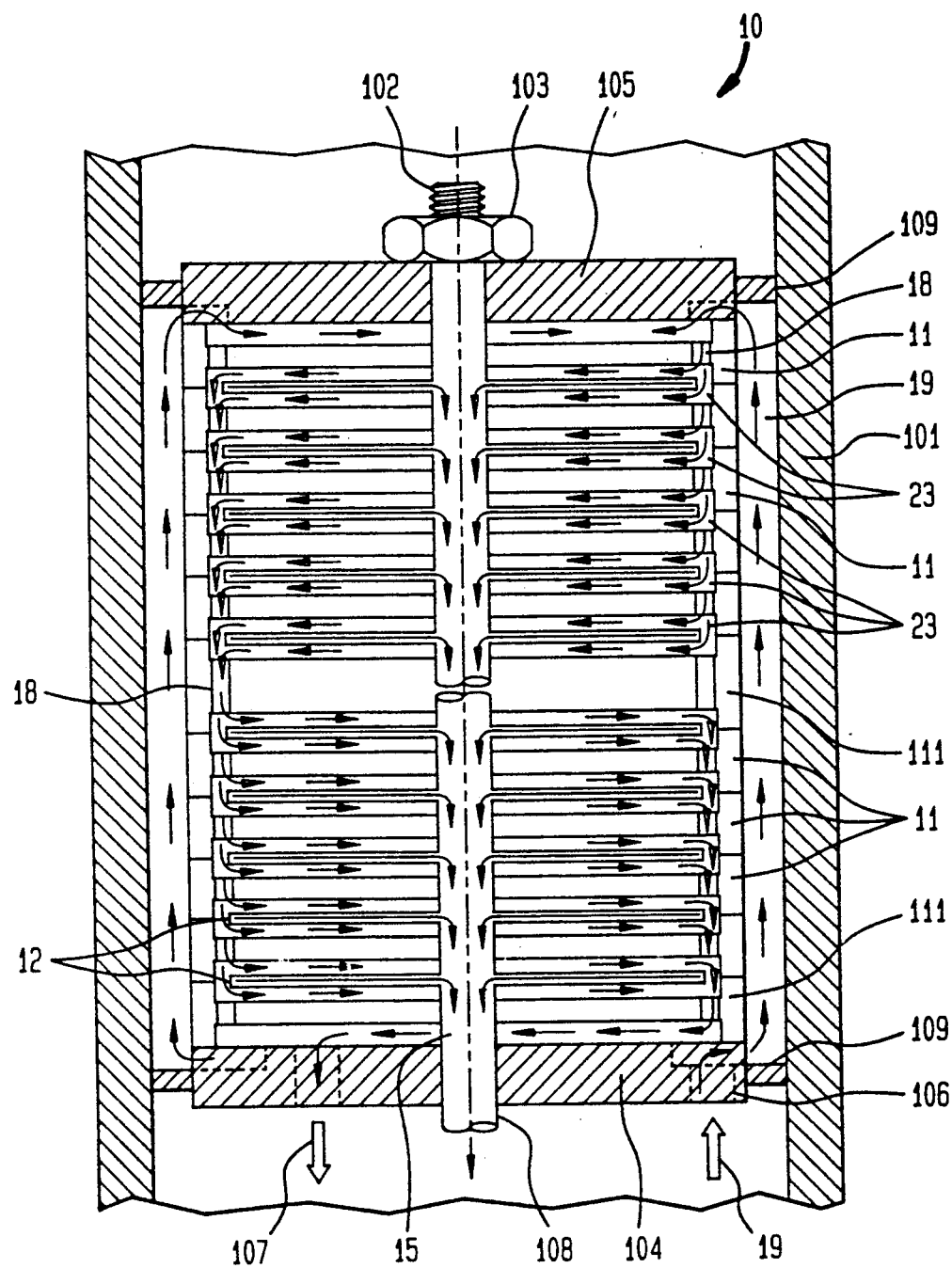
FIG. 3 is a cross-sectional view of the apparatus suitable for use in the practice of the present invention.

With reference to FIG. 3, there is shown a cross-sectional view of a typical apparatus suitable for use in the practice of the present invention.

Shown in FIG. 3 is a filtering apparatus 10 for filtering and separating a flowing medium by reverse osmosis. The apparatus comprises a plurality of spacer elements 11 having filter elements 12 therein. These elements are stacked in the apparatus to form a filter element stack of predetermined length.

For a better understanding of the construction of the spacer element, the apparatus 10 will be explained in conjunction with filter elements 12 in the form of diaphragm cushions or pads. The apparatus 10 essentially comprises a tubular casing 101, spacer elements 11 and filter elements 12 are alternately disposed in the casing 101, i.e. a filter element 12 is disposed between each two spacer elements 11. Only at the two ends of a filter element stack that is formed in this way does the spacer element have no filter element 12. At the connection end of the filter element stack a connection flange 104 is provided; at the opposite end of the filter element stack, a terminal flange 105 is provided. The filter element stack and the two flanges 104, 105 are held together by a central clamping bolt 102 that extends through appropriate central holes of all of the aforementioned elements, whereby at both ends of the filter element stack the clamping bolt 102 is provided with nuts 103 that hold the filter element stack together; for the sake of simplification, merely one of the nuts 103 is shown in FIG. 3. The filter element stack is sealed off in a known manner via gaskets or other seals 109 relative to the tubular casing 101 into which the filter element stack is placed.

Provided in the connection flange 104 is an opening or inlet 106 for the introduction of the flowing medium 19, which represents an unfinished solution that is to be separated (i.e. a solution that has not been treated at all or has not been completely treated), as well as an outlet 108 for the filtrate and an outlet 107 for the retentate.

Via the inlet opening 106 provided in the connection flange 104, the flowing medium 19 enters the interior of the casing 101, and in particular into the gap between the filter element stack and the inner wall of the casing 101. In this gap, the flowing medium 19 passes into the space formed between the terminal flange 105 and the adjacent spacer element 11. The flowing medium 19 is symbolized within the apparatus 10 by arrows.

In the apparatus 10 illustrated in FIG. 3, the upper most spacer element 11 has only a single passage 18 for the flowing medium, with this passage being provided in the rim region 16 in the disk member. The flowing medium 19 passes through this passage 18 into a chamber 23 formed between two spacer elements 11 and since several spacer elements 11 are disposed in such a way that the passages 18 are arranged one above the other, the flowing medium 19 passes into the chamber 23 of respectively adjacent spacer elements 11 disposed therebelow.

In the illustrated embodiment of FIG. 3, a unit is formed of five spacer elements 11 that are connected with one another in this manner.

As noted, a filter element 12 is disposed in each chamber 23. The flowing medium 19 that is in the chambers 23 sweeps or passes over both sides of a respective filter element 12 that is disposed in the chamber 23. In FIG. 3, the flow is from right to left flowing toward the left side of the spacer element 11, whereby in the rim portion in the disk member there is similarly formed a passage 18 for the flowing medium 19.

In the filter elements 12, which are disposed in the chambers 23 and are in the form of diaphragm pads, the filtrate is conveyed to an opening provided in the filter element 12, i.e. in the diaphragm pad. In the apparatus illustrated in FIG. 3, i.e. in the diaphragm pad 12 used therein, the aforementioned opening is a central opening. The filter elements 12, i.e. diaphragm pads, accommodated in the chambers 23 are sealed off relative to the spacer elements that confine them in a known manner in the region toward the filtrate outlet opening, which is symbolized by the central hole 15.

The spacer element 111 that is in the illustration of FIG. 3 delimits the bottom of the aforementioned unit that is formed of five spacer elements 11 is provided, just as was the case with the uppermost spacer element 11, with merely a single passage 18 for the flowing medium 19, with this passage being provided in the rim region 16 in the disk member 17. As a result, as shown in FIG. 3, the flowing medium 19 can pass through the aforementioned spacer element 11 through only the single passage 18. In the apparatus 10 illustrated in FIG. 3, the bottom of this unit is delimited by a spacer element 111 that again is provided with only a single passage 18 embodied in the rim region 16 in the disk member 17, so that through this passage 18, all of the concentrated flowing medium 19 (retentate) that leaves the apparatus 10 can leave the same through the outlet 107 that is formed in the connection flange 104.

The filter element employed in the practice of the invention is a semipermeable membrane comprised of a polyimide having repeating units of the general formula:

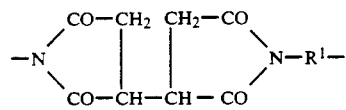

wherein $R^1$ represents a divalent organic group.

Typical of the membranes suitable for this purpose are those in which $R^1$ is represented by the general formula:

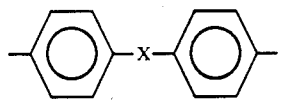

wherein x represents a divalent linking group such as: —CH—, —C(CH$_3$)$_2$—, —O—, —CO$_2$—, etc.

Prior Art

Example 1

Production of Polyimide Ultrafiltration Membrane

To an N-methyl-2-pyrrolidone solution containing 28% by weight of polyimide having an imidation rate of 99% or more and an inherent viscosity (n) of 0.73 which had the above-described general formula wherein $R^1$ was

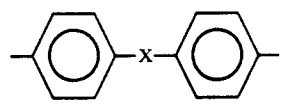

100 parts by weight of diethylene glycol based on 100 parts by weight of polyimide were added as a swelling agent to prepare a homogenous dope. This dope was applied to the inside of a glass tube by cast coasting, and the glass tube is put into water of 5° C. at once and immersed for 5 hours to obtain a tubular ultrafiltration membrane having an inner diameter of 12 mm, a thickness of 200 μm and a molecular weight cut-off of 20,000.

The module equipped with this membrane was attached to the liquid passage line for the miscella of crude soybean oil composition as described in the following.

A 27 wt. % hexane miscella of crude soybean oil containing 2.18% by weight (based on the weight of the soybean oil) of phospholipid, as the crude glyceride oil composition, was subjected to ultrafiltration treatment by passing through the above-described membrane module in circulation under conditions of a pressure of 3kg/cm$^2$, a temperature of 40° C. and a flow rate of 14/1 minute. From the resulting membrane permeable liquid, hexane was distilled away to obtain an ultrafiltration treated oil.

25 Tons of this oil were heated to about 85° C. A 75% phosphoric acid solution was added to the ultrafiltration treated oil in an amount of 0.5% by weight based on the weight of the oil to carry out acid treatment by stirring. Then this ultrafiltration treated oil was additionally heated to 110° C., and activated clay was added in amount of 0.8% by weight based on the weight of the treated oil. After stirred for 30 minutes under 110 mm Hg, activated clay was filtered off by a filter press to obtain a bleached. This bleached oil was then heated to 260° C., and deodorizing was carried out by stripping with sparge steam in an amount of 4.5% by weight based on the bleaching oil under 4 mm Hg abs for 85 minutes to obtain 20 tons of a purified soybean oil. The resulting purified soybean oil was preserved for 3 months in an outdoor storage tank, and a preservation test was carried out.

What is claimed is:

1. A method of refining an edible oil comprising:
   providing a crude edible oil composition containing impurities and an organic solvent;
   tangentially contacting, in parallel, the crude oil composition with each of one side of a plurality of first semipermeable membrane filter elements to produce a plurality of first permeate streams on each of the other sides of the first filter elements and a plurality of first retentate streams on each of the one sides of the plurality of first filter elements,
   removing and collecting the plurality of first retentate streams from the one sides of the first filter elements to form a first collected retentate;
   removing the plurality of first permeate streams from the other sides of the first filter elements to form a first collected permeate;
   tangentially contacting, in parallel, the first collected retentate with each of one side of a plurality of second semipermeable membrane filter elements to produce a plurality of second permeate streams on each of the other sides of the second filter elements and a plurality of second retentate streams on each of the one sides of the plurality of second filter elements;
   removing and collecting the plurality of second retentate streams from the one sides of the second filter elements to form a second collected retentate;
   removing the plurality of second permeate streams from the other sides of the first filter elements to form a second collected permeate; wherein the semipermeable membrane comprises:
   a polyimide consisting of a repeating unit of the general formula

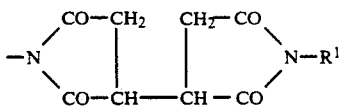

wherein R[1] represent a divalent organic group of the general formula

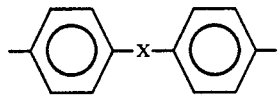

wherein x represent a divalent leeching group selected from the group consisting of $-CH_2-$, $-CH(CH_3)_2-$, $-O-$, and $-SO_2$ whereby the collected permeates contain the refined edible oil substantially free of impurities and organic solvent.

2. The method of claim 1, wherein the collected permeates are subsequently subjected to micella bleaching, evaporation and physical refining.

3. The method of claim 1, wherein said edible oil is selected from the group consisting of soybean oil, cottonseed oil, rapeseed oil, corn oil, sunflower oil, canola oil, and peanut oil.

4. The method of claim 1, wherein said organic solvent is hexane.

5. The method of claim 1, wherein the crude oil is contacted with the polyimide at a temperature ranging from 0°–15° C. at a pressure ranging from 0.1 to 50 mm/cm².

* * * * *